United States Patent [19]
Hsiao

[11] Patent Number: 5,481,607
[45] Date of Patent: Jan. 2, 1996

[54] AUTOMATIC REWINDING DEVICE FOR THE CONDUCTOR OF A TELEPHONE TRANSMITTER

[76] Inventor: Tien J. Hsiao, 4FL., No. 304, Shih Dong Rd., Taipei, Taiwan

[21] Appl. No.: 330,300

[22] Filed: Sep. 30, 1994

[51] Int. Cl.⁶ ........................................... H04M 1/00
[52] U.S. Cl. ................................. 379/438; 379/437
[58] Field of Search ................................ 379/438, 437, 379/451; 191/12.4, 12.2 R; 439/4, 528

[56] References Cited

U.S. PATENT DOCUMENTS

| | | | |
|---|---|---|---|
| 5,117,456 | 5/1992 | Aurness et al. | 379/438 |
| 5,241,593 | 8/1993 | Wagner | 379/438 |

*Primary Examiner*—Jeffery A. Hofsass
*Assistant Examiner*—Jack Chiang
*Attorney, Agent, or Firm*—Pro-Techtor International

[57] ABSTRACT

An automatic rewinding device outside a telephone set for retracting its conductor, wherein a housing comprises a bottom seat and a cap having a plug connected with the telephone set; the conductor is wound in a conductor connecting seat on the top of a rotation plate in the housing, several conducting pieces in the seat contact a conducting disk which contacts some conducting springs connected to the plug through some concentric conducting rings in the conducting disk, a coiled spring and a stop mechanism comprising a cam and a stop sheet spring and a blocking piece etc. are disposed on the bottom of the rotation plate, with such structure, when the transmitter with the conductor is lifted or pulled out for use, the rotation plate will be rotated to store a recovering force in the coiled spring, the conductor pulled to a desired length can be fixed at that length by the stop mechanism, when not in use, the conductor can be pulled slightly outwardly to release engaging of the stop mechanism to retract the conductor into the housing.

1 Claim, 4 Drawing Sheets 5,481,607

AUTOMATIC REWINDING DEVICE FOR THE CONDUCTOR OF A TELEPHONE TRANSMITTER

BACKGROUND OF THE INVENTION

1. Field of the Invention

The present invention relates to an automatic rewinding device for the conductor of a telephone transmitter, and especially to one which can be connected by a plug to a jack for the transmitter conductor on the telephone set, and has the conductor wound therein; the conductor of which one end is connected with the transmitter is collected in a housing of the device when not in use, and can be pulled out for a suitable length pursuant to practical requirement when being used; the device can provide protection for and collect the conductor, and beautify and tidy up the appearance of the telephone set.

2. Description of the Prior Art

Telephone sets widely used in the world have coiled conductors between their telephone bodies and their transmitters except those sets with wireless transmitters, such conductors have on their both ends the clip connecting plugs for inserting in the jacks on the telephone sets and the transmitters. Thereby, a conventional telephone set occupies more space because the conductor is piled up outside the set, yet the irregular tangling of the conductor (especially on those sets used frequently) may adversely influence the appearance of the telephone set, moreover, a conductor having used for a long term can be distorted due to frequent tearing, and can be transformed to have ugly appearance, besides, the conductor can be scrubed by a table or tangled by other things when the transmitter is frequently taken up, moved and put down in using of the telephone, hence we always see that the surface of a transmitter is heavily damaged by scrubing, and thus is subject to contamination, these are all attributed to that the conductor of the transmitter is not well stored or protected.

SUMMARY OF THE INVENTION

In view of this, the inventor of the present invention has successfully developed an automatic rewinding device for the conductor of a telephone transmitter to solve the problems in the structure of the transmitter of a telephone stated above based on his professional experience in designing, producing and using of the communication equipments and the peripheric products thereof, which device can receive and protect the conductor, and beautify and tidy up the appearance of the telephone set.

The present invention will be apparent in its practical structure, characteristics and functions after reading the detailed description of the preferred embodiment thereof in reference to the accompanying drawings,

DETAILED DESCRIPTION OF THE PREFERRED EMBODIMENT

Figure 6:
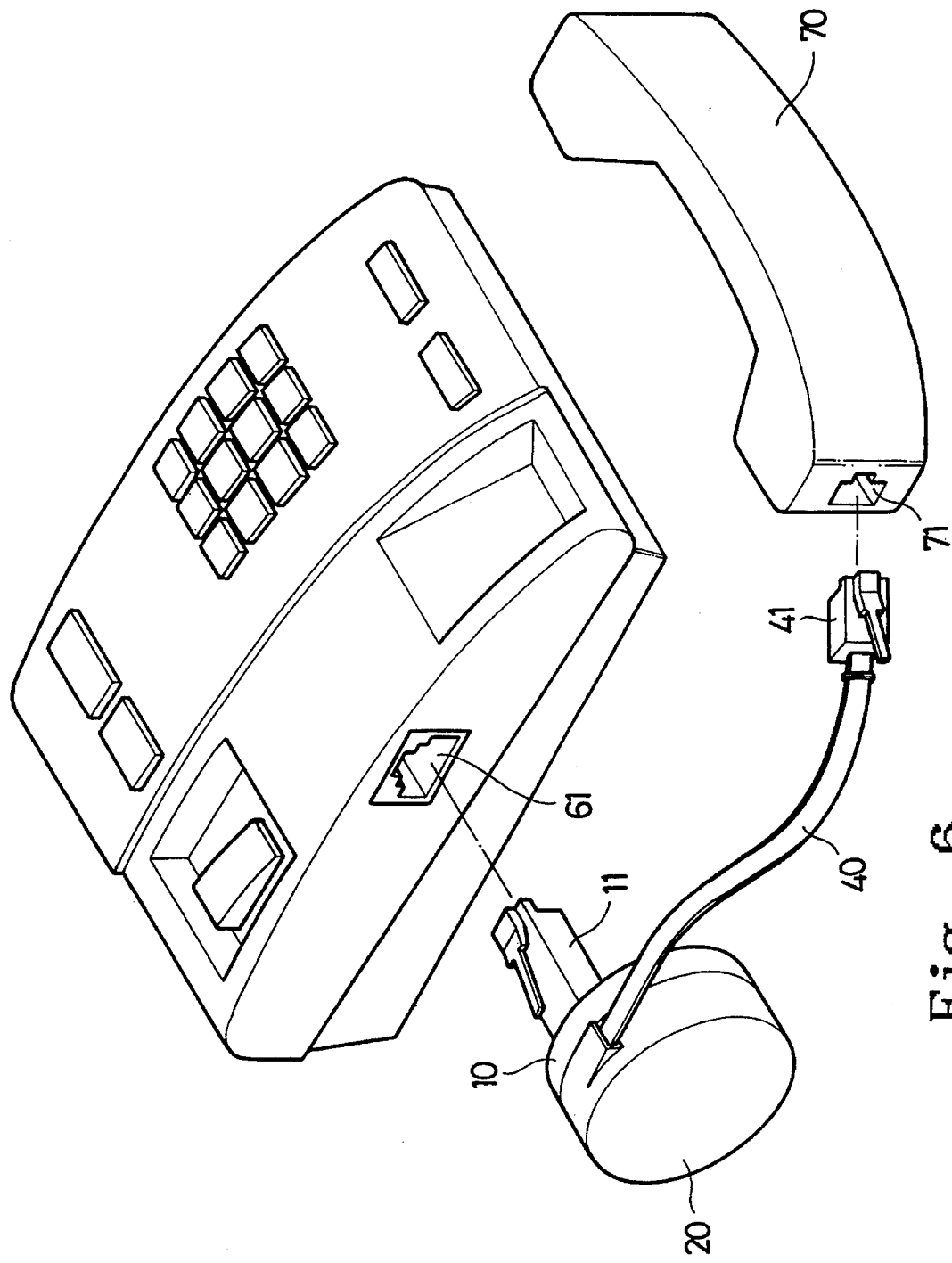
FIG. 6 is a schematic view showing use of the present invention.

Referring to FIG. 1 to 4, it can be seen that the present invention is comprised of a housing including a cap 10 and a bottom seat 20, and a rotation plate 30, a stop mechanism, wherein:

the cap 10 provides with a plug 11 which can be inserted in a jack 61 of the telephone set 60 as shown in FIG. 6. The plug 11 has a plurality of conducting pieces 12 embeded therein, a spring fixing disk 13 (FIG. 1 and 3) is provided inside the cap 10 and exactly under the plug 11, the disk 13 has a plurality of conducting springs 14 inserted therein, each spring 14 contacts respectively a conducting piece 12, and a plurality of snap hooks 15 are provided intermittently along the inner periphery of the cap 10;

the bottom seat 20 has an inner central axle 21 which has a middle axial slit 22, a plurality of engaging slots 23 which are corresponding in position to those snap hooks 15 of the cap 10 are provided on the upper inner wall of the bottom seat 20, the cap 10 composes with the bottom seat 20 a housing by engaging of the snap hooks 15 with the engaging slots 23, and a conductor outlet 24 is provided on one side of the bottom seat 20, yet a blocking piece 25 (which is one member of the stop mechanism) is provided on the bottom of the above mentioned inner wall;

the rotation plate 30 has on the top face thereof a conductor connecting seat 31 which provides with a central hole 32 aligned with the center of the rotation plate 30, a plurality of conducting pieces 33 are embeded from outside atop into the seat 31, on one side of the seat 31 there is provided with a conductor insertion hole 34 extending to the conducting pieces 33, a conductor winding base seat 35 is provided surrounding the conductor connecting seat 31, the base seat 35 has a plurality of conductor blocking pieces 36 near its top edge, the conductor 40 is to be wound around the conductor winding base seat 35 (referring to FIG. 1 and 4), the conductor 40 has a plurality of flat core wires and provides with a plug 41 connectable to a transmitter 70 on the outside end thereof, the inside end thereof is to be inserted into the conductor insertion hole 34 on one side of the conductor connecting seat 31, let the conducting pieces 33 of the conductor connecting seat 31 pierce the insulation covering of the conductor 40 to respectively electrically contact the flat core wires, yet there is a conducting disk 50 embeded in the top portion of the conductor winding base seat 35 (referring to FIG. 1 and 4), the conducting disk 50 has embeded therein a plurality of concentric conducting rings 51 which are different in diameter, a plurality of conducting springs 52 corresponding to these conducting rings 51 are provided on the bottom surface of the conducting disk 50 for contacting the conducting rings 51, when the conducting disk 50 is embeded on the top of the conductor winding base seat 35, the conducting springs 52 can electrically connect exactly with the corresponding conducting pieces 33 of the conductor connecting seat 31; further, an annular spring seat 37 is provided on the bottom of the rotation plate 30 (referring to FIG. 3), a coiled spring 38 is disposed therein to let the outer end 381 of the spring hook on the surface of the annular spring seat 37 through a slot 371 thereon, while the inner end 382 of the spring 38 hooks the inner central axle 21 through the middle axial slit 22 mentioned above, the stop mechanism is provided at one side of the annular spring seat 37 (to be narrated later); the rotation plate 30 is pivotally put in the housing composed of the cap 10 and the bottom seat 20, the axle 21 of the bottom seat 20 is inserted in the central hole 32 of the rotation plate 30, the conductor 40 is pulled out of the conductor outlet 24, in this assembly, the conducting springs 14 of the cap 10 electrically contact respectively the concentric conducting rings 51 on the rotation plate 30, they keep contact no matter in what manner the rotation plate 30 is rotated.

Figure 1:
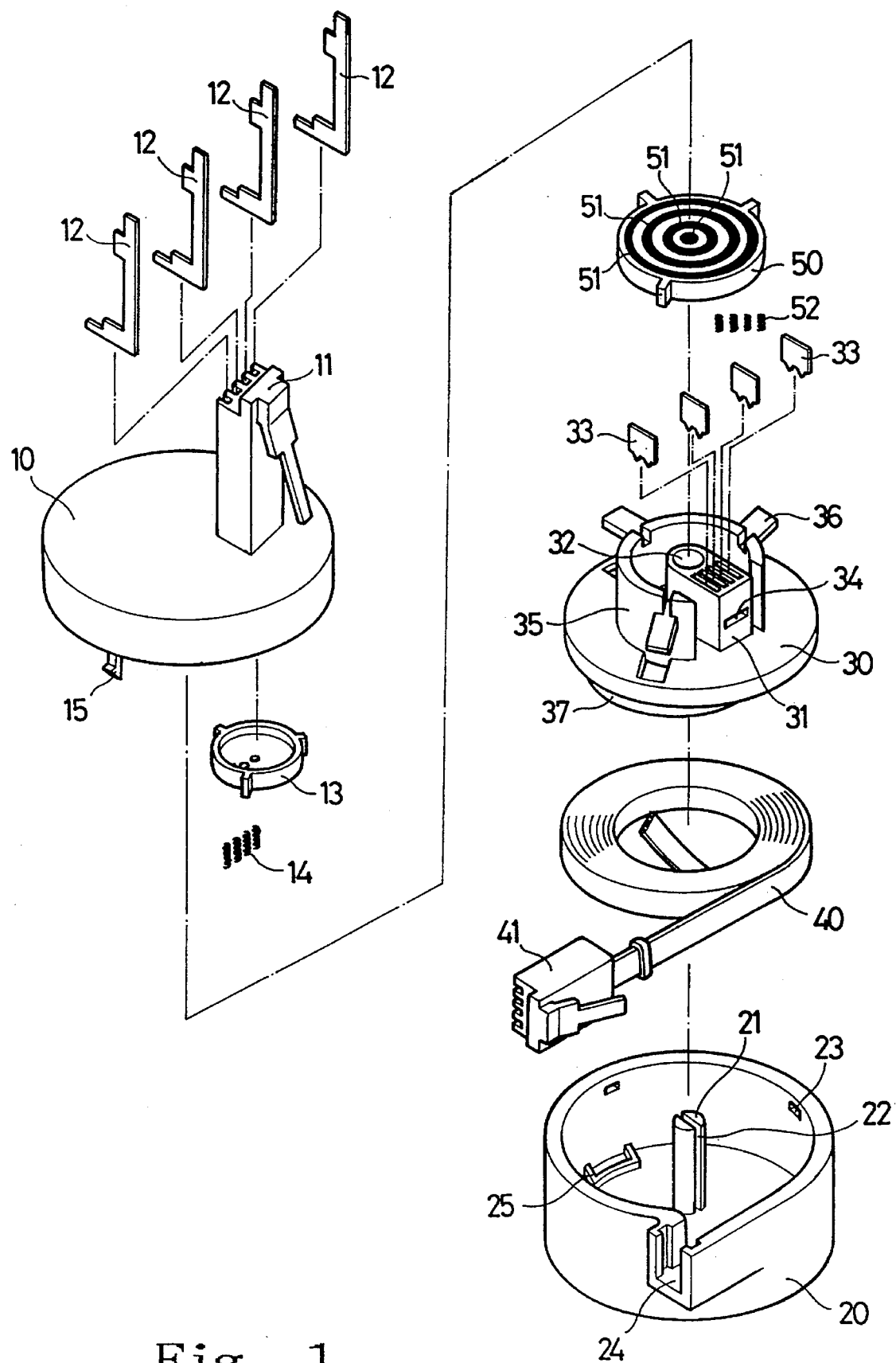
FIG. 1 is an analytic drawing showing the structure of the present invention.
Figure 2:
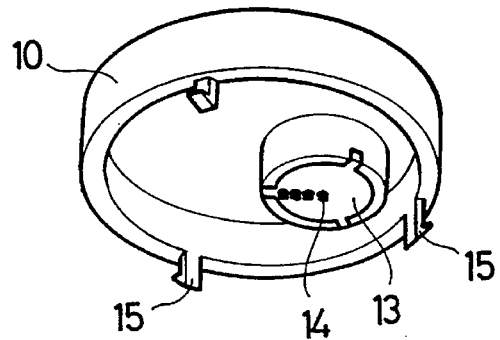
FIG. 2 is a perspective view showing the bottom detail of a cap of the present invention.
Figure 3:
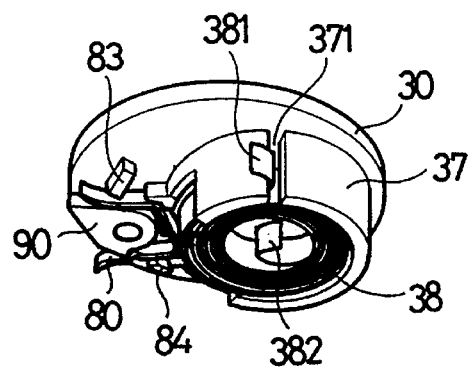
FIG. 3 is a perspective view showing the bottom detail of a rotation plate of the present invention.
Figure 4:
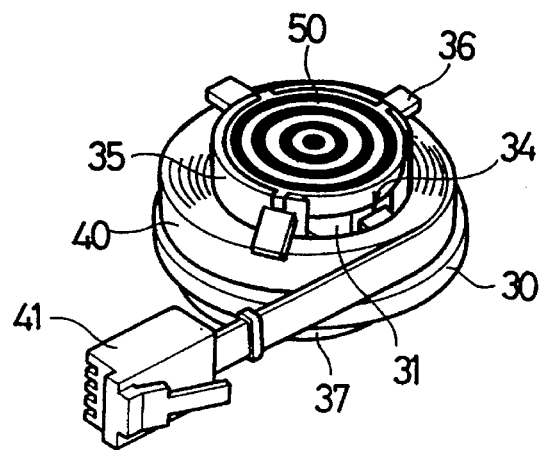
FIG. 4 is a perspective view showing the top detail of the rotation plate.
Figure 5:
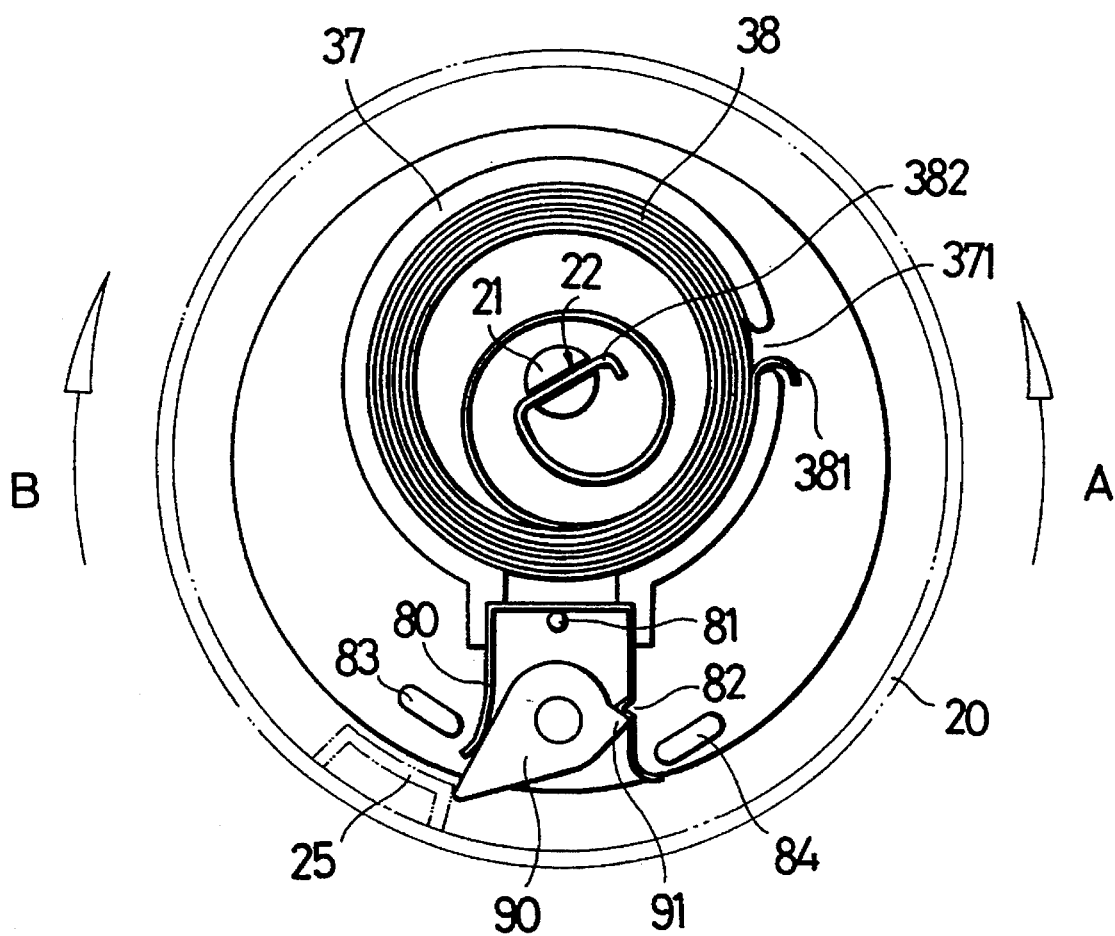
FIG. 5 is a schematic view of a stop mechanism of the present invention.

The stop mechanism (as shown in FIG. 3 and 5) has embeded therein a U shaped stop sheet spring 80 held at one side of the annular spring seat 37 on the bottom of the rotation plate 30 by a protruding pin 81, one leg of the stop sheet spring 80 provides with an engaging lug 82, a cam 90 is pivotally provided within the area of the stop sheet spring 80 on the surface of the rotation plate 30, the cam 90 has a protruding shoulder 91 at the location of the engaging lug 82, a pair of protruding pieces 83, 84 is provided at both sides of the stop sheet spring 80; the outer end of the cam 90 is abutted against one leg of the stop sheet spring 80 and is exposed ordinarily outside the rotation plate 30, this outer end contacts exactly the blocking piece 25 of the above mentioned bottom seat 20.

Based on the above stated structure, the present invention is used as shown in FIG. 6, i.e., the present invention is connected by inserting the plug 11 into the jack 61 of the telephone set 60 and inserting the plug 41 of the conductor 40 which is drawn out from the housing of the present invention into a jack 71 of the transmitter 70. When the telephone is not in use, the conductor 40 is rewound into the housing by the rewinding force of the coiled spring 38 which rotates the rotation plate 30, so that the conductor 40 can be protected well by the present invention, it is not subject to pollution of dirt, and also is not space occupying, in this way, the telephone set can wholly have a much more neat, clean as well as elegant appearance. While when the telephone is in use, the transmitter 70 is lifted up, and the conductor 40 will be pulled out from the housing accordingly, the rotation plate 30 will be rotated thereby, the coiled spring 38 can thereby store a recovering force, as shown in FIG. 5, when the conductor 40 is pulled out to rotate the rotation plate 30 in a direction as shown by an arrow A depicted in FIG. 5, the stop mechanism will rotate as a whole in the direction A too, and when the outer end of the cam 90 is rotated till it contacts one side the blocking piece 25 of the bottom seat 20, the outer end of the cam 90 can pass the blocking piece 25, so that the rotation plate 30 can rotate continuously without impediment, i.e., the conductor 40 can be pulled out for any length desired (within its total length), and when the conductor 40 is pulled to a desired length, the rotation plate 30 can be rotated in a counter direction (i.e. the direction B as shown in the drawing) by the restoring force of the coiled spring 38 when the conductor 40 is released, while when the rotation plate 30 is rotated to the position that the outer end of the cam 90 contacts the other side of the blocking piece 25, the engaging lug 82 on the right leg of the stop sheet spring 80 engages the protruding shoulder 91 of the cam 90 to impede the cam 90 from passing through the blocking piece 25, in this case, the rotation plate 30 is completely blocked, and the conductor 40 is stoped in that length, and the telephone can be used in a easy way. When a phone call is finished and the transmitter 70 is to be put back to its original position, it is needed only to pull outwardly the transmitter 70 (together with the conductor 40) to the direction as shown by the arrow A in the drawing and release the pulling force soon, at this time, a restoring force is produced which renders the protruding shoulder 91 of the cam 90 to rush through the engaging lug 82 on the right leg of the stop sheet spring 80 to allow the protruding shoulder 91 to be at a position above the engaging lug 82, the cam 90 can thus be free to pass through the blocking piece 25, by then, the rotation plate 30 can be rotated backwardly (in the direction shown by the arrow B) freely by the restoring force of the coiled spring 38 and in turn retracts the conductor 40 into the housing, thus completes the operation of automatic conductor retraction. While when next time the transmitter 70 is lifted up (together with the conductor 40 which will be pulled outward) till the rotation plate 30 is rotated to the position that the outer end of the cam 90 contacts the other side of the blocking piece 25 (the protruding shoulder 91 is still at the position above the engaging lug 82), the protruding shoulder 91 will rush through the engaging lug 82 by the pulling force and to be at a position under the engaging lug 82, the conductor 40 can thereby pulled out from the housing by the same procedure mentioned above, and is stoped in an appropriate length thereof, and then can be retracted, this is delicate in design and convenient in use.

Accordingly, the novel structure of the present invention gets rid effectively of the defects resided in a conventional telephone set wherein the conductor is exposed outside; with the present invention, the conductor can be stored and protected well, and can be drawn out for a suitable length which can be fixed for use, and can be retracted automatically when after use, this is practically a novel and effective improvement against the conventional arrangement for the conductor. The structure stated above has never existed in the markets and hence has novelty and improveness.

Having thus described my invention, what I claim as new and desire to be secured by Letters Patent of the United States is:

1. An automatic rewinding device for a conductor of a telephone transmitter, said device is comprised of a housing including a cap and a bottom seat, a rotation plate, and a stop mechanism, in the structure thereof:

said cap provides with a plug which is insertable in a jack of a telephone set; said plug has a plurality of conducting pieces embeded therein, a spring fixing disk is provided inside said cap and exactly under said plug, said spring fixing disk has a plurality of first conducting springs inserted therein, said conducting springs each contacts respectively one of said conducting pieces, and a plurality of snap hooks are provided intermittently along a inner periphery of said cap;

said bottom seat has an inner central axle which has a middle axial slit, a plurality of engaging slots which are corresponding in position to said snap hooks of said cap are provided on a upper inner wall of said bottom seat, said cap composes with said bottom seat a housing by engaging of said snap hooks with said engaging slots, and a conductor outlet is provided on one side of said bottom seat, yet a blocking piece is provided on the bottom of said inner wall;

said rotation plate has on a top face thereof a conductor connecting seat which provides with a central hole aligned with the center of said rotation plate, a plurality of second conducting pieces are embedded from outside atop into said conductor connecting seat, on one side of said conductor connecting seat there is provided with a conductor insertion hole extending to said second conducting pieces, a conductor winding base seat is provided surrounding said conductor connecting seat, said conductor winding base seat has a plurality of conductor blocking pieces near its top edge, said conductor of the telephone is to be wound around said conductor winding base seat, said conductor of the telephone has a plurality of flat core wires and provides with a plug connectable to a transmitter on an outside end thereof, an inside end thereof is to be inserted into said conductor insertion hole on one side of said conductor connecting seat, let said second conducting pieces of said conductor connecting seat pierce the insulation covering of said conductor to respectively electrically contact said flat core wires, yet there is a conducting disk embedded in a top portion of said conductor winding base seat, said conducting disk has embedded therein a plurality of concentric conducting rings which are different in diameter, a plurality of second conducting springs corresponding to said conducting rings are provided on a bottom surface of said conducting disk for contacting said conducting rings, when said conducting disk is embedded on the top of said conductor winding base seat, said second conducting springs electrically connect correspondingly and exactly with said second conducting pieces of said conductor connecting seat; further, an annular spring seat is provided on a bottom surface of said rotation plate, a coiled spring is disposed therein to let an outer end of said coiled spring hook on a surface of said annular spring seat through a slot thereon, while an inner end of said coiled spring hooks the inner central axle through said middle axial slit, said stop mechanism is provided at one side of said annular spring seat; said rotation plate is pivotally put in the housing composed of said cap and said bottom seat, said axle of said bottom seat is inserted in said central hole of said rotation plate, said conductor is pulled out of said conductor outlet, in this assembly, said first conducting springs of said cap electrically contact respectively said concentric conducting rings on said rotation plate, said first conducting springs and said concentric conducting rings keep in contact no matter in what manner said rotation plate is rotated;

said stop mechanism has embeded therein a U shaped stop sheet spring held at one side of said annular spring seat on the bottom of said rotation plate by a protruding pin, one leg of said stop sheet spring provides with an engaging lug, a cam is pivotally provided within an area of said stop sheet spring on the bottom surface of said rotation plate, said cam has a protruding shoulder at the location of an engaging lug, a pair of protruding pieces is provided at both sides of said stop sheet spring; an outer end of said cam is abutted against one leg of said stop sheet spring and is exposed ordinarily outside said rotation plate, said outer end contacts exactly said blocking piece of said bottom seat.

* * * * *